United States Patent [19]

Bhagwat et al.

[11] 4,405,977

[45] Sep. 20, 1983

[54] COMMUTATION CIRCUITS FOR THYRISTOR INVERTERS

[75] Inventors: Pradeep M. Bhagwat, Baltimore, Md.; Victor R. Stefanovic, Charlottesville, Va.

[73] Assignee: Canadian Patents and Dev. Limited, Ottawa, Canada

[21] Appl. No.: 296,296

[22] Filed: Aug. 26, 1981

[30] Foreign Application Priority Data

Sep. 25, 1980 [CA] Canada .................................. 363141

[51] Int. Cl.³ ...................... H02M 1/06; H02M 7/515
[52] U.S. Cl. ................................... 363/124; 363/136; 363/138
[58] Field of Search .................................. 363/57–58, 363/96, 124, 135–139; 307/252 C, 252 M

[56] References Cited

U.S. PATENT DOCUMENTS

| | | | |
|---|---|---|---|
| 3,207,974 | 9/1965 | McMurray | 363/136 |
| 3,475,674 | 10/1969 | Porterfield et al. | 363/136 |
| 3,781,645 | 12/1973 | Grom et al. | 363/138 |
| 3,832,573 | 8/1974 | Ver Planck et al. | 363/57 X |
| 4,274,137 | 6/1981 | Hase | 363/136 X |

OTHER PUBLICATIONS

Bhagwat et al., "Some New Aspects in the Design of PWM Inverters", Conference: Industry Applications Society IEEE–IAS Annual Meeting, Cleveland, OH, USA (30 Sep.–4 Oct. 1979), pp. 383–393.

Bhagwat et al., "Generalized Structure of a Multilevel PWM Inverter", IEEE–IAS Conference, Cincinnati, Ohio, USA, Sep. 28 to Oct. 3, 1980, pp. 791–803.

Primary Examiner—William M. Shoop
Assistant Examiner—Peter S. Wong
Attorney, Agent, or Firm—Edward Rymek

[57] ABSTRACT

The commutation circuit for commutating a conducting thyristor includes an inductance, a capacitance and a commutation thyristor all connected in series with the conducting thyristor and the dc source, the commutation thyristor initiates the commutation when triggered. The circuit further includes a first diode connected in reverse polarity across the commutation thyristor and a second diode connected in reverse polarity across the commutation thyristor-capacitance series circuit. The voltage across the capacitance is zero when each commutation cycle is initiated, and also when each commutation cycle ends.

11 Claims, 7 Drawing Figures

COMMUTATION CIRCUITS FOR THYRISTOR INVERTERS

BACKGROUND OF THE INVENTION

The present invention is directed to thyristor inverter circuits and, in particular, to commutation circuits for thyristors.

With the present interest in the use of variable frequency induction motors, state of the art inverters, whether they are thyristor or transistor based, are attracting attention. The thyristor inverter described in U.S. Pat. No. 3,207,974 which issued on Sept. 21, 1965 to W. McMurray, remains one of the most preferred, particularly in its modified form wherein a pair of diodes are connected across the commutation thyristors with a damping resistor connected between the juncture of the pair of diodes and the juncture of the commutation thyristors. This inverter is advantageous since it has a high efficiency, its commutation circuit components are small and it is suitable for pulse width modulation (PWM) operation. On the other hand, it has been found that this inverter has a propensity for misfirings and shoot-throughs and that protection against commutation failure or short circuit is difficult.

Power transistor inverters have emerged as a solution to many of these problems due to their control flexibility, however, power transistors cannot provide the power levels required in many applications.

SUMMARY OF THE INVENTION

It is therefore an object of this invention to provide reliable and flexible commutation for thyristors.

This and other objects are achieved in a commutation circuit for a thyristor which when conducting applies, a dc voltage to a load, where the commutation circuit includes an inductance, a capacitance and a commutation thyristor connected in series with the main thyristor, a first diode connected in reverse polarity across the commutation thyristor and a second diode connected in reverse polarity across the series connected commutation thyristor and capacitance, whereby the commutation of the thyristor is initiated by triggering the commutation thyristor. A further diode may be connected in reverse polarity across the thyristor to obtain soft or current commutation.

In an inverter which has at least a pair of inverter thyristors connected in series across a dc source with a juncture between the thyristors for connection to a load, the thyristor commutation circuit includes a pair of series connected commutation thyristors which are connected in parallel with the main pair of thyristors and a diode which is connected in reverse polarity across each of the thyristors. A first capacitance is connected between the juncture that is between the commutation thyristors and the juncture between the inverter thyristors. A first inductance is series connected between the dc source and the pairs of thyristors. The first inductance may be a single inductor or a number of inductors located in the various commutation paths in the inverter circuit.

The commutation circuit may further include a second inductance connected between the dc source and the first inductance with a diode connected in reverse polarity across it, and a second capacitance connected in series with the second inductance across the dc source to provide fuseless protection.

In addition, a series connected ac switch and resistor may be connected across the first capacitance to ensure the complete discharge of the first capacitance.

In an inverter which has at least a pair of inverter thyristors connected in series across a variable dc source with a juncture between the inverter thyristors for connection to a load, the thyristor commutation circuit is essentially similar in operation, but requires added components and a separate fixed dc commutation source. The fixed dc source, with blocking diodes, is connected across the pair of inverter thyristors. A pair of series connected commutation thyristors and a pair of series connected auxiliary thyristors are connected in parallel across the fixed dc source. The juncture between the auxiliary thyristors is connected to the juncture between the inverter thyristors. A diode is connected in reverse polarity across each of the commutation and inverter thyristors. A first capacitance is connected between the juncture between the commutation thyristors and the juncture between the inverter thyristors. A first inductance is series connected between the fixed dc source and the pairs of commutation and auxiliary thyristors. A series connected ac switch and resistor may be connected across the first capacitance to ensure the complete discharge of the first capacitance.

Many other objects and aspects of the invention will be clear from the detailed description of the drawings.

DETAILED DESCRIPTION

Figure 1:
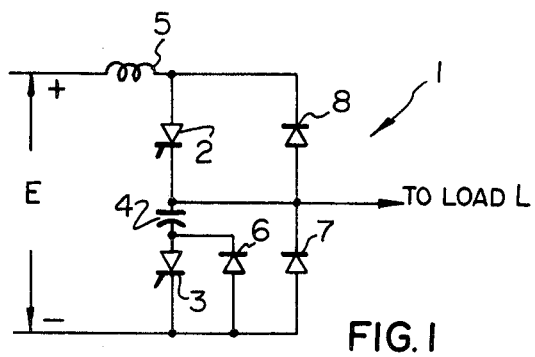
FIG. 1 illustrates the commutation circuit in a single quadrant chopper.

The commutation circuit in accordance with the present invention is illustrated in FIG. 1 where it is used with a single quadrant chopper 1. The chopper 1 consists of a gate controlled rectifier or thyristor 2 connected between a dc power source E and a load L. Load L will normally be predominantly inductive such as a motor which prevents sudden change in the load current. The commutation circuit for the thyristor 2 includes an auxiliary thyristor 3, a capacitor 4 and inductor 5, all connected in series with thyristor 2 and the power source E. The capacitor 4 and the thyristor 3 must be connected in parallel with the load L, however, the inductor 5 can be in any part of the series circuit. An auxiliary diode 6 is connected in reverse polarity across the thyristor 3 and a further diode 7 is connected in reverse polarity across thyristor 3 and capacitor 4. A further commutating diode 8 may be connected in reverse polarity across thyristor 2 if current commutation is used, i.e. the voltage drop across diode 8 is caused by a current flow through it, turns off the thyristor 2.

Figure 2:
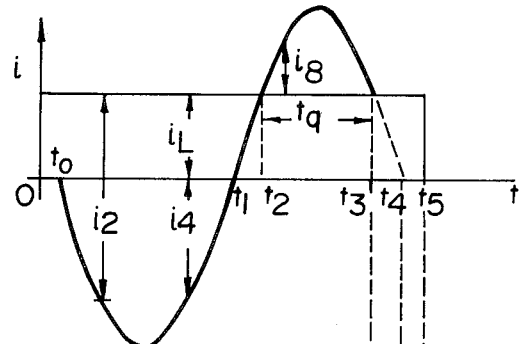
FIG. 2 illustrates currents and voltages in the circuit in FIG. 1.
Figure 2:
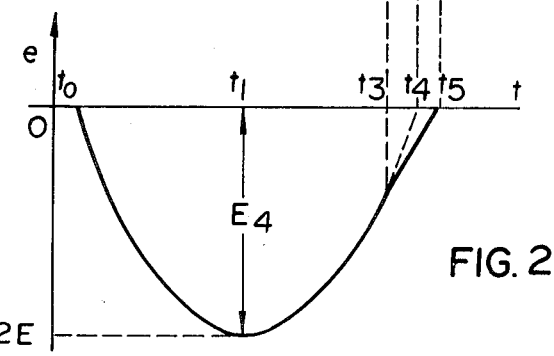

In operation, the power source E voltage is supplied to the load L via thyristor 2 in a controlled manner. Thyristor 2 is turned on by applying a pulse signal to the gate of thyristor 2 and turned off by the commutation circuit in accordance with the present invention. It is to be noted that capacitor 4 is at zero voltage while thyristor 2 is conducting and remains so until the beginning of each commutation cycle. The commutation of conducting thyristor 2 is initiated by triggering thyristor 3 at the desired time $t_o$ which is shown in FIG. 2. FIG. 2 illustrates the current $i_4$ through capacitor 4, the current $i_L$ through load L and the voltage $E_4$ across capacitor 4 during the commutation cycle to $t_o$-$t_5$. With thyristor 3 turned on, an oscillating current flows through inductor 5, thyristor 2, capacitor 4, and thyristor 3 back to the source E. At this time, the current $i_2$ through thyristor 2 is the sum of the currents $i_4$ through capacitor 4 and the current $i_L$ to load L. After reaching its peak, the the current $i_4$ decreases and reverses at $t=t_1$, flowing from $E(-)$ through diode 6 and capacitor 4. Since the load current $i_L$ is constant this causes a decrease in the $i_2$ current. At $t=t_2$, the capacitor current $i_4$ equals the load current $i_L$ and the thyristor current $i_2$ becomes zero. During the interval $t_2$-$t_3$, the excess of the capacitor current $i_4$ is passed through diode 8 back to the source E, $(i_8=i_4-i_L)$. The voltage drop across diode 8 produces reverse biasing across thyristor 1 which commutates the thyristor 1. At $t=t_3$, the capacitor current $i_4$ is again equal to the load current $i_L$ and diode 8 stops conducting. From $t=t_3$ to $t=t_5$, the capacitor is supplying load L with a constant current, $i_8=i_L$ and the capacitor voltage $E_4$ decreases linearly. At $t=t_5$, diode 7 starts to conduct and the capacitor current $i_4$ falls sharply to zero. The length of the $t_3$-$t_5$ interval depends on the magnitude of the load current $i_6$, the capacitor 4 resistance, the Q-factor of the inductor L and the supply voltage E. With the capacitor 4 discharged, it is again ready for the next commutation cycle. The next commutation cycle does not have to be initiated until another thyristor has to actually be commutated.

If hard or voltage commutation is desired, diode 8 is not included across the thyristor 2 to be commutated. A reverse biasing voltage of $E-E_4$ occurs across thyristor 2, this voltage is much larger than any voltage provided by the forward voltage drop on diode 8 and turns-off the thyristor 2 in a very short time. However, this type of commutation increases the voltage transients in the circuit. The design of the inverter circuit in accordance with the present invention follows the conventional procedures established for McMurray-type circuits. The expressions for the value of the commutation capacitance $C_4$ and inductance $L_5$ are $$C_4 = \frac{i_L \, tq}{2E \, v \, \text{arc cos} \, v} \, e^{3\pi/4Q} \quad (1)$$

$$L_5 = \frac{v \, E \, tq}{2i_L \, \text{arc cos} \, v} \, e^{-3/4Q} \quad (2)$$

where
 $i_L$ is the load current
 tq is the thyristor 2 turn-off time,
 E is the source voltage,
 $v$ is the ratio between the maximum load current, and the peak commutation current which is $E/\sqrt{L_5/C_4}$
 Q is $\sqrt{L_5/C_4}/R$, and
 R is the total resistance of commutation circuit path.

Figure 3:
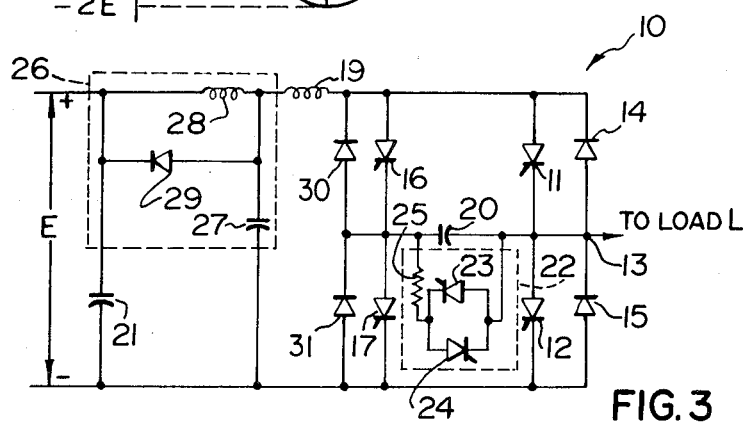
FIG. 3 illustrates the commutation circuit in a single phase inverter.

FIG. 3 illustrates a single phase inverter 10 which utilizes the commutation circuit in accordance with the present invention. This single phase inverter 10 may be used by itself or as one of an n-phase inverter fed from the same dc source E.

The inverter 10 consists of a pair of thyristors 11 and 12 connected to a voltage source E with the load L connected to the juncture 13 between thyristors 11 and 12. Thyristors 11 and 12 apply power of opposite polarity to the load L resulting in an alternating current of desired frequency through the load L.

The commutation circuit includes a commutating diode 14, 15 connected in reverse polarity across each of the thyristors 11 and 12. Auxiliary thyristors 16 and 17, each with a diode 30, 31, connected across it in reverse polarity, are connected to the source E. The commutation circuit further includes a commutation inductor 19 between the source E and the thyristors and a commutation capacitor 20 connecting juncture 13 to the juncture between thyristors 16 and 17.

The inverter 10 in FIG. 3 operates in the same manner as the chopper circuit described in FIG. 1. Conducting thyristor 11 is commutated by triggering thyristor 17 which causes an oscillating current in the path inductor 19, thyristor 11, capacitor 20, and thyristor 17 and which turns thyristor 11 off in the same manner as described in FIG. 1. Conducting thyristor 12 is commutated by triggering thyristor 16 which produces an oscillating current in the path inductor 19, thyristor 16, capacitor 20 and thyristor 12. It is to be noted that since the voltage on capacitor 20 is always zero when commutation is initiated, thyristors 11 and 12 may alternately be triggered and commutated for simple inverter operation, or each thyristor 11 or 12 may be triggered and commutated a number of times in sequence for pulse width modulated inverter operation. The need for resetting or recharging the commutation circuit as in conventional commutation circuits is not required.

The inverter in FIG. 3 further includes a filter capacitor 21 which responds to the instant current demand for the load L when an inverter thyristor 11, 12 is turned on.

Referring to FIG. 2, with no-load current, the commutation capacitor 20 should be ideally discharged at time $t_4$. However, due to an inherent resistance in the commutation circuit (finite Q-factor) the circuit is not purely oscillatory but has some damping. Consequently, there will be some charge left on the capacitor 20 when the diode 30 stops conducting. With zero load current $i_L$, this charge will be present when the next commutation cycle is initiated. If 11 and 12 are commutated alternately, this charge will alternate its polarity, without causing problems, providing all components can withstand the increased peak of the capacitor current. However, if either of the two main thyristor 11, 12 has to be commutated several times in succession there will be a pump-up increase of the commutation capacitor 20 voltage. To avoid that and to decrease the circuit's clearing time during light loads, a discharge circuit 22 is connected across the capacitor 20. The circuit consists of an ac switch which may be a triac or a pair of reverse polarity connected thyristors 23, 24 or transistors, in series with a resistor 25. Normally the discharge of capacitor 20 through resistor 25 may be initiated at the time $T_4$, however, the discharge may be delayed depending on the operating frequency.

The reliability of the inverter circuit, in accordance with the present invention, may be further enhanced by adding a further dc side commutation circuit 26 to the inverter. This commutation circuit 26, as illustrated in FIG. 3, includes a parallel connected capacitor 27, a series connected inductor 28 shunted by a diode 29. This dc side commutation circuit 26 automatically turns off all inverter thyristors in case of a shoot through or a short between the inverter input terminals providing fuseless protection. Consider a shoot-through caused by an accidental triggering of both thyristors 16 and 17, or 11 and 12. The short circuit current would rise in an oscillatory manner with a period determined by capacitor 27 and inductor 19. The role of inductor 19 is to transiently isolate the voltage source E from the rest of the circuit by keeping the supply current constant. When the oscillating current reverses direction all diodes 14, 15, 30, 31 conduct and all thyristors 11, 12, or 16, 17, are commutated by the diode forward voltage drop. Further current reversal is blocked by the diodes 14, 15, 30 and 31. An attempt to re-start the inverter can then be made.

A practically identical process occurs when a short develops across the inverter terminals or when a thyristor fails to commutate. In all of these cases, an oscillatory current starts to discharge the capacitor 27 through a fault and then rings back through diodes 14, 15, 30, 31, thus commutating all thyristors 11, 12, 16, 17. The isolating inductance 28 has to be 50–60 times the commutation inductance 19 in order to effectively limit the current rise during a fault. Capacitor 27 has to be more than 5 times the commutation capacitor 20. The diode 29 provides a free-wheeling path for the current trapped in inductor 28 at the end of the commutation. This prevents a damping of the magnetic energy stored in inductor 28 and on capacitor 27 which would force the capacitor voltage significantly above the source voltage E.

It is to be noted, however, that, for practical reasons, fuses are still needed to protect against component failure. Furthermore, commutation circuit 26 will not protect against a high resistance short, such as arcing, since practically all commutation energy will be dissipated in the arc. It is to be noted that only one dc side commutation circuit 26 is required even in an n-phase inverter.

Figure 4:
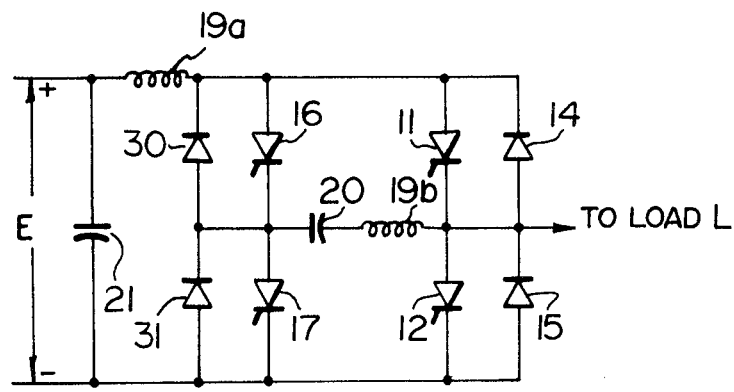
FIGS. 4 and 5 illustrate inverters having split commutation inductances.
Figure 5:
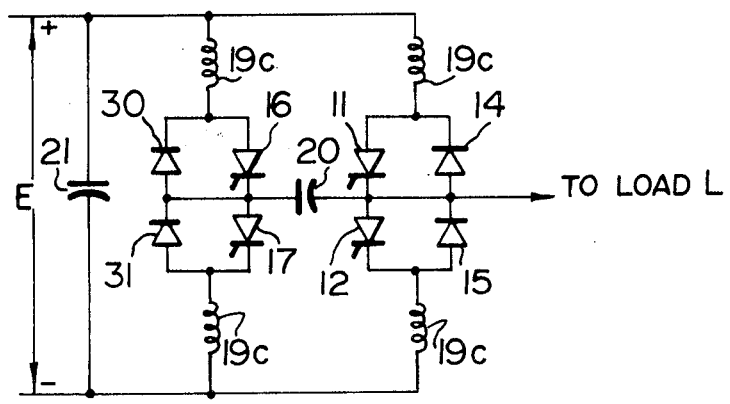

FIGS. 4 and 5 illustrate inverters in accordance with the present invention in which the commutating inductance in the circuit is divided or split. In FIG. 4, the commutation inductance is split into inductor 19a and 19b, where inductances $L_{19a}$ and $L_{19b}$ of inductors 19a and 19b, respectively, are equal to the inductance $L_{19}$ of inductor 19 (FIG. 3). The commutation process is the same as in FIG. 3, i.e. the commutation of thyristor 11 being initiated by the triggering of thyristor 17 and the commutation of thyristor 12 being initiated by the triggering of thyristor 16, with capacitor 20 being at zero voltage.

If the ratio between inductors 19a and 19b is $$L_{19a}/L_{19b} = N$$

then the voltage $V_T$ across the thyristors which do not conduct during commutation, i.e. thyristors 12 and 16, when thyristor 11 is commutated, is $$V_T = \frac{NE_{20} + E}{N+1}$$

where $E_{20}$ is the voltage across the commutating capacitor 20. The maximum voltage $E_{20}$ is 2E, as seen in FIG. 2, and therefore:

$$V_{Tmax} = \frac{2NE + E}{N+1} = \frac{2N+1}{N+1} E$$

Since inductor 19a is normally smaller than inductor 19b, then the maximum voltage $V_T$ will be significantly smaller than 2E. However, fuseless protection using the dc-side commutation circuit described in FIG. 3 will not work well with this split inductance circuit since the peak commutation current which discharges capacitor 27 (FIG. 3), will become too high with inductor 19a being much smaller than inductor 19 (FIG. 3).

In FIG. 5, the inductance is split between each of the thyristor arms such that the inductance of each inductor 19c is half of the inductance of inductor 19 (FIG. 3).

The thyristor 11, 12, 16, 17, rating in this case is reduced to 1.5E and may be used with the protection circuit described in FIG. 3. This split inductance configuration ensures current sharing between all inverter legs when the commutation current through capacitor 20 rings back. Other variations of a split inductance including the use of saturable reactors are possible to obtain different degrees of reduction of the thyristor voltage ratings.

Figure 7:
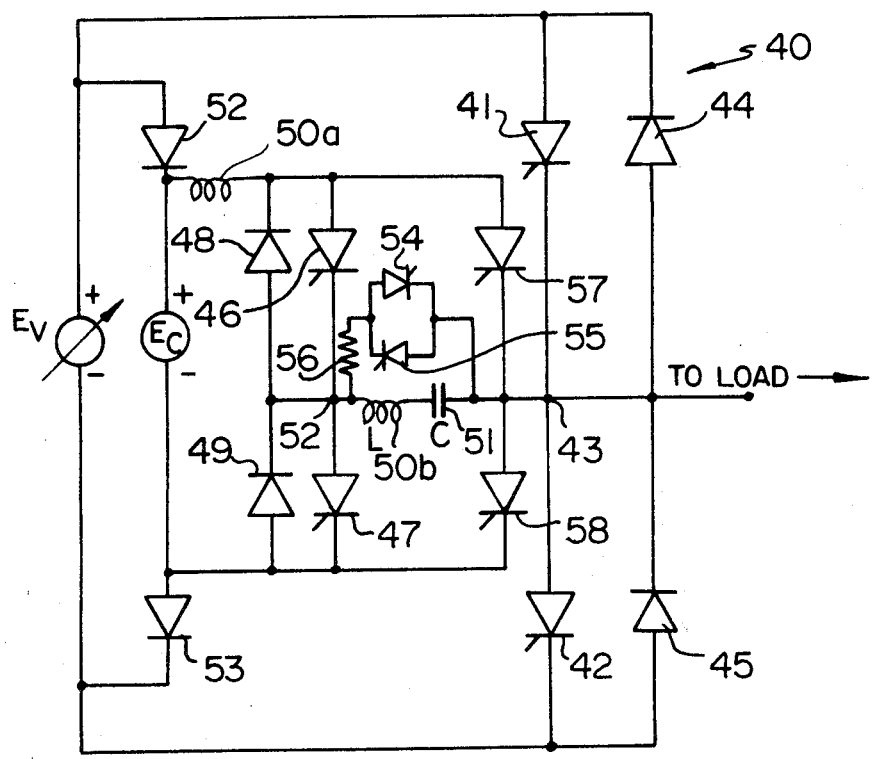
FIG. 7 illustrates the commutation circuit for a variable dc source single phase inverter.

FIG. 7 illustrates a commutation circuit in accordance with the present invention for an inverter where the dc source is variable and may be adjusted to values near zero. The inverter 40 consists of a pair of thyristors 41 and 42 connected in series across a variable voltage source $E_v$. The load L is connected to the juncture 43 between thyristors 41 and 42. Thyristors 41 and 42 apply power of opposite polarity to the load L resulting in an alternating current of desired frequency through the load L.

The commutation circuit includes commutating diodes 44, 45 connected in reverse polarity across each of the thyristors 41 and 42. Auxiliary thyristors 46 and 47, each with a diode 48, 49, respectively, connected across it in reverse polarity, are connected to a fixed commutation voltage source $E_c$. The commutation circuit further includes a commutation inductor 50a between the source $E_c$ and the thyristors 46, 47, and a series connected commutation capacitor 51 and inductor 50b connecting juncture 43 to the juncture 52 between thyristors 46 and 47. In order to complete the loop for the commutation of thyristors 41 or 42, diodes 52 and 53 are connected across the positive and negative terminals, respectively, of voltage sources $E_v$ and $E_c$. Diodes 52 and 53 provide the loop connection and also prevent current flow from source $E_c$ to source $E_v$ which is smaller.

As in FIG. 2, a discharge circuit which consists of a pair of reverse polarity connected thyristors 54 and 55 and a series resistor 56 are connected across inductor 50b and capacitor 51, assures that a build-up of voltage on capacitor 51 will not occur. Since the commutation circuit has its own voltage source, a pair of auxiliary charging thyristors 57 and 58 are required. They are connected from load juncture 43 to the cathode of thyristor 46 and the anode of thyristor 47, respectively.

To commutate thyristor 41 both thyristors 47 and 57 are triggered producing an oscillating current by charging and discharging capacitor 51. Capacitor 51 is charged through path source $E_c$, inductor 50a, thyristor 57, capacitor 51, inductor 50b and thyristor 47, back to source $E_c$. The maximum charge on capacitor 51 is $2E_c$. Capacitor 51 is discharged by feeding the energy stored back to the source $E_c$ through the path source $E_c$, diode 49, inductor 50b, capacitor 51, diode 44 and diode 52. The voltage drop across diode 44 reverse biases thyristors 41 and 57 turning them both off. The process for commutating thyristor 42 is similar to that described above with respect to thyristor 41, with thyristors 46 and 58 being triggered to initiate the commutation.

Figure 6:
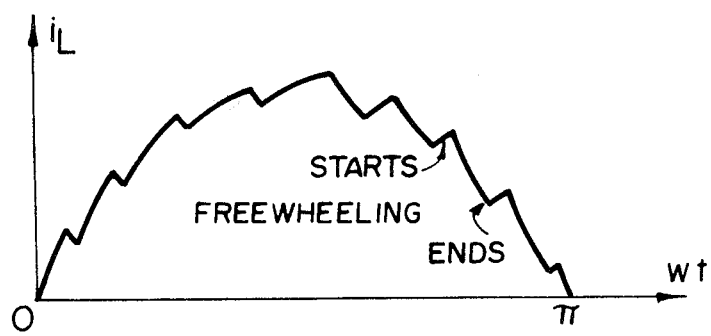
FIG. 6 illustrates one half cycle of inverter output current for a pulse width modulation inverter.

The inverter circuit in accordance with the present invention finds particular advantage for use as a pulse width modulation inverter whether it be a single level or a multi-level inverters. Referring to FIG. 3, when an inverter operates with a PWM control, supplying an inductive load, the output current normally does not reverse every time a thyristor is commutated but freewheels through a corresponding diode as seen in FIG. 6. With repeated triggering of thyristor 11, during a positive half-cycle, the current free-wheels through diode 15, and thyristor 12 starts conducting only at $wt = \pi$. The circuit in accordance with the present invention does not need extra commutations during a PWM operation, since, with zero voltage across the capacitor 20, the circuit is always ready for the commutation of any thyristor at any time.

Further, the present commutation circuit gives the flexibility of programming any commutation sequence desired and, therefore, it is suitable for multi-level pulse width modulation. The application of this circuit to multi-level PWM is described in the publication "Generalized Structure of a Multilevel PWM Inverter"—P. Bhagwat and V. R. Stefanovic, IEEE—IAS Conference, Cincinnati, Ohio, U.S.A.—Sept. 28 to Oct. 3, 1980, which is hereby incorporated by reference.

Many modifications in the above described embodiments of the invention can be carried out without departing from the scope thereof and, therefore the scope of the present invention is intended to be limited only by the appended claims.

We claim:

1. In a thyristor circuit for applying a dc voltage through a thyristor to a load, a commutation circuit for the thyristor comprising:
    inductance means, normally discharged capacitance means and a commutation thyristor connected in series with said thyristor;
    a first diode connected in reverse polarity across the commutation thyristor; and
    a second diode connected in reverse polarity across the series connected capacitance means and commutation thyristor.

2. A commutation circuit as claimed in claim 1 which includes a third diode connected in reverse polarity across said thyristor.

3. In an inverter circuit having at least a pair of first and second thyristors connected in series across a dc source with a first juncture between the first and second thyristors for connection to a load, a thyristor commutation circuit comprising:
    a pair of series connected first and second commutation thyristors connected in parallel with the first and second thyristors;
    a diode connected in reverse polarity across each of the first and second thyristors and the first and second commutation thyristors;
    normally discharged first capacitance means connected to a second juncture between the first and second commutation thyristors and the first juncture; and
    first inductance means series connected between the dc source and the pairs of thyristors.

4. A commutation circuit as claimed in claim 3 which further includes an ac switch and resistance means connected across the capacitance means for discharging the capacitance means.

5. A commutation circuit as claimed in claim 3 which further includes filter capacitance means connected across the dc source.

6. A commutation circuit as claimed in claim 5 which further includes:
    a second inductance means connected between the dc source and the first inductance means;
    a diode connected in reverse polarity across the second inductance means; and
    second capacitance means connected in series with the second inductance means across the dc source.

7. A commutation circuit as claimed in claim 4, 5, or 6 wherein the first inductance means is a single inductor connected between the dc source and the pairs of thyristors.

8. A commutation circuit as claimed in claim 4, 5, or 6 wherein the first inductance means includes a first inductor connected between the dc source and the pairs of thyristors, and a second inductor connected in series with the capacitance means between the first and second junctures.

9. A commutation circuit as claimed in claim 4, 5, or 6 wherein the first inductance means consists of an inductor connected directly to each of the thyristors.

10. In an inverter circuit having at least a pair of inverter thyristors connected in series across a variable dc source with a first juncture between the inverter thyristors for connection to a load, a thyristor commutation circuit comprising:
    a series circuit having a first blocking diode, a fixed dc source and a second blocking diode connected across the series connected inverter thyristors;
    a pair of series connected commutation thyristors and a pair of series connected auxiliary thyristors connected in parallel across the fixed dc source, the juncture between the auxiliary thyristors being connected to the first juncture;
    a diode connected in reverse polarity across each of the pair of inverter thyristors and the pair of commutation thyristors;
    first capacitance means connected to a juncture between the commutation thyristors and the first juncture; and
    first inductance means series connected between the fixed dc source and the pairs of commutation and auxiliary thyristors.

11. A commutation circuit as claimed in claim 10 which further includes an ac switch and resistance means connected across the capacitance means for discharging the capacitance means.

* * * * *